J. W. SCHLEICHER.
CRATE OR RACK MAKING MACHINE.
APPLICATION FILED OCT. 16, 1912.

1,090,655.

Patented Mar. 17, 1914.
6 SHEETS—SHEET 2.

Witnesses:

Inventor:
John W. Schleicher,
By Dodge and Sons,
Attorneys.

J. W. SCHLEICHER.
CRATE OR RACK MAKING MACHINE.
APPLICATION FILED OCT. 16, 1912.

1,090,655.

Patented Mar. 17, 1914.
6 SHEETS—SHEET 3.

Witnesses:

Inventor
John W. Schleicher,
By Dodge and Sons,
Attorneys.

J. W. SCHLEICHER.
CRATE OR RACK MAKING MACHINE.
APPLICATION FILED OCT. 16, 1912.
1,090,655.
Patented Mar. 17, 1914.
6 SHEETS—SHEET 4.
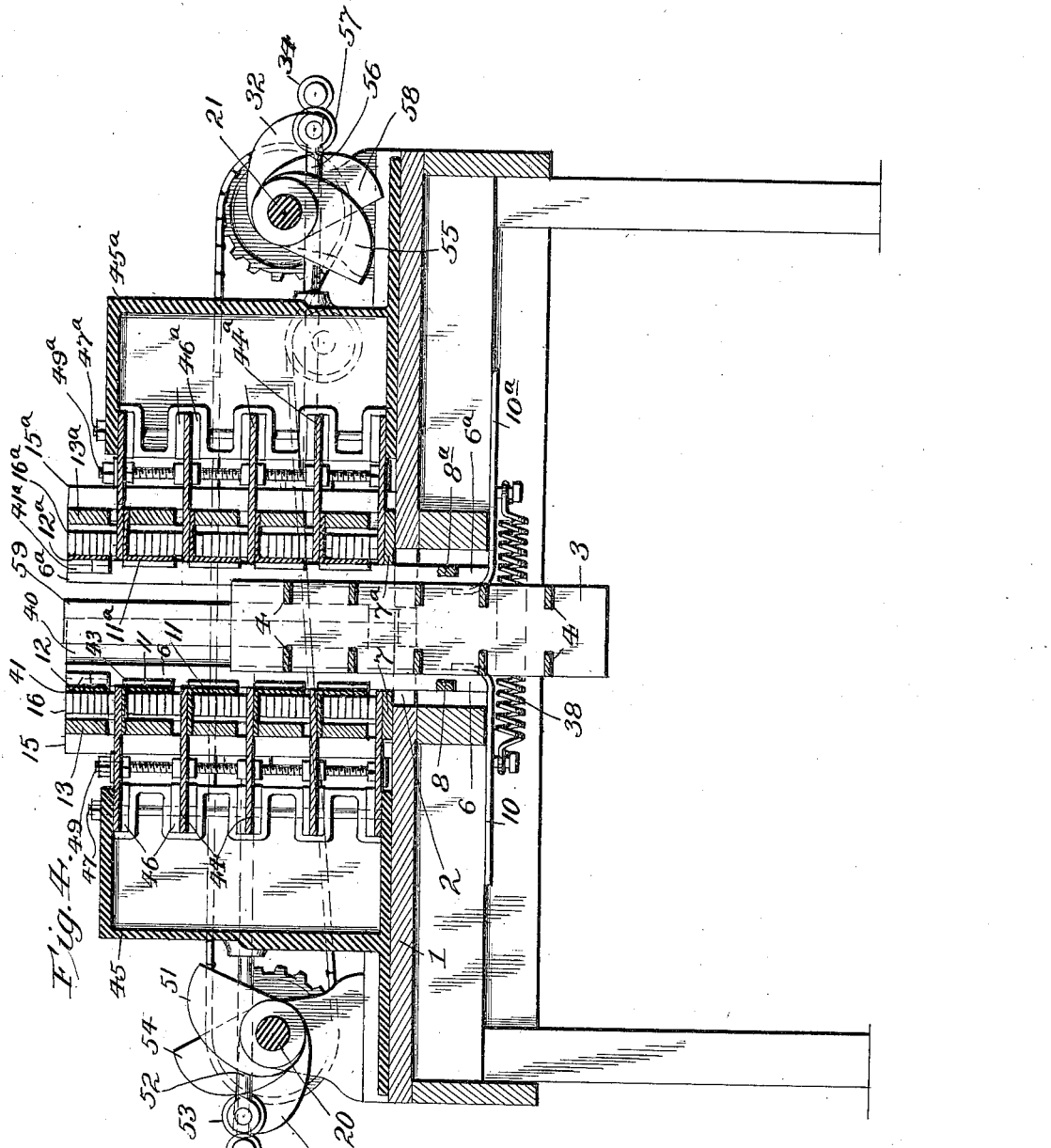
Witnesses:
C. H. Raeder
H. Smoot
Inventor
John W. Schleicher,
By Dodge and Sons,
Attorneys.

J. W. SCHLEICHER.
CRATE OR RACK MAKING MACHINE.
APPLICATION FILED OCT. 16, 1912.
1,090,655.
Patented Mar. 17, 1914.
8 SHEETS—SHEET 5.
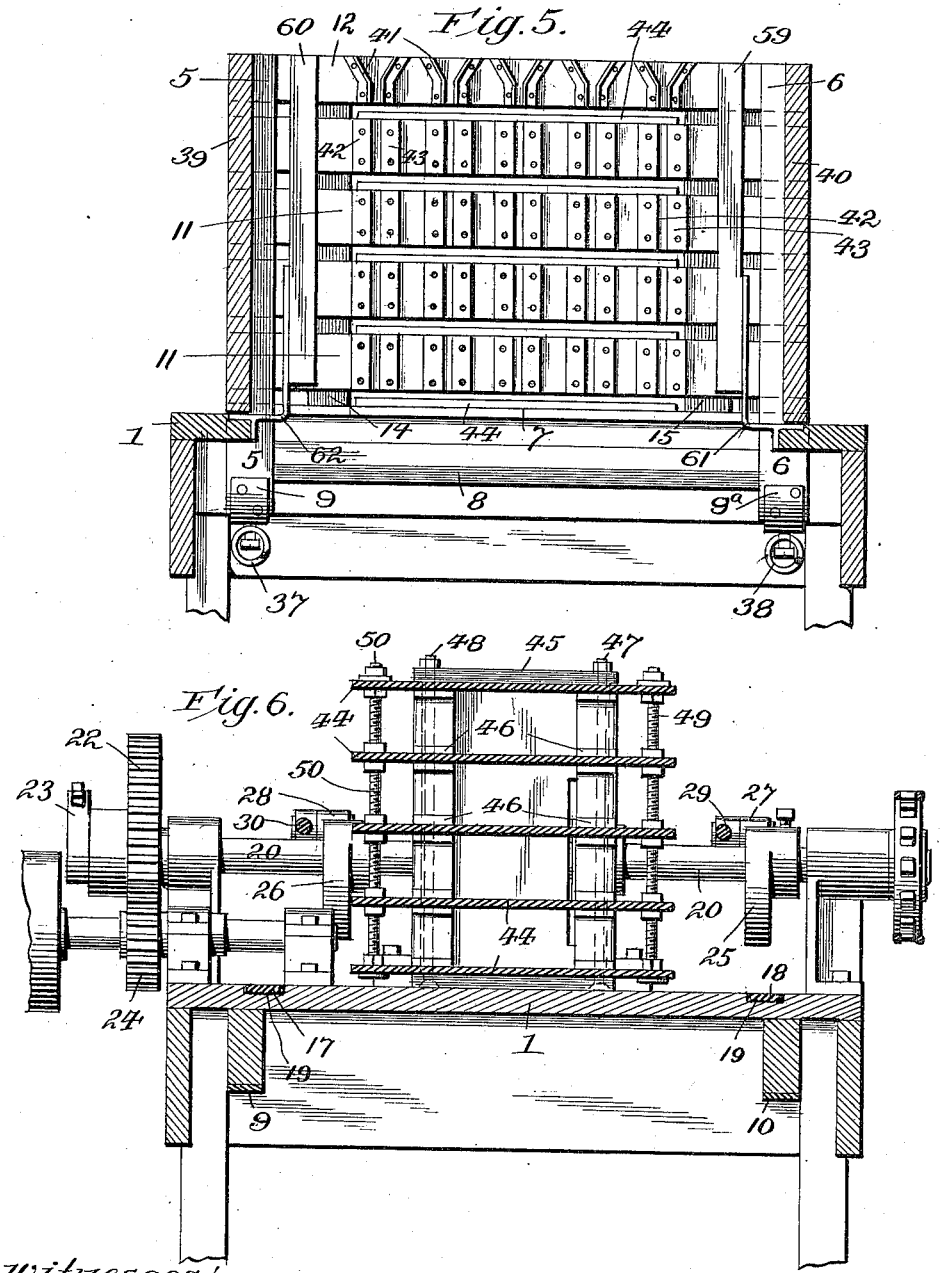

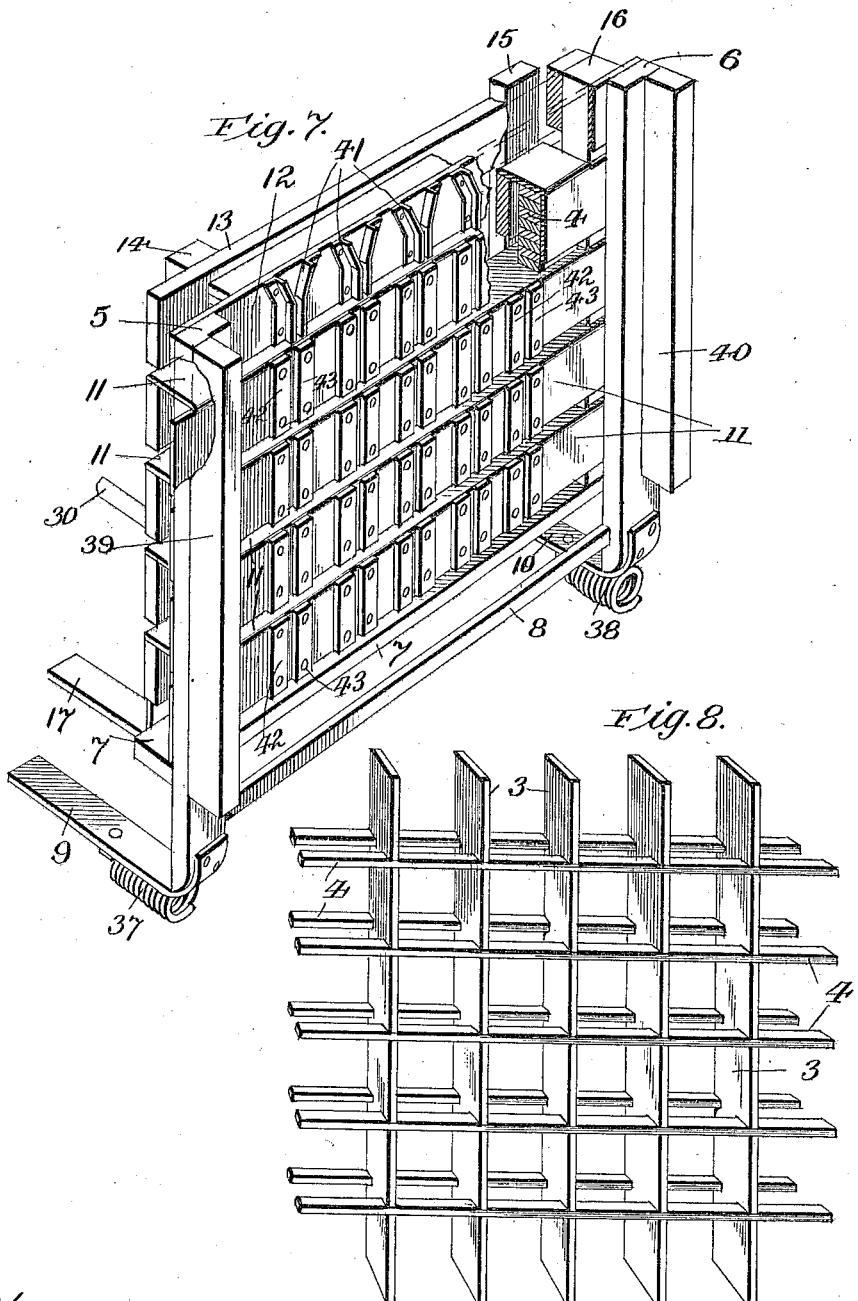

UNITED STATES PATENT OFFICE.

JOHN W. SCHLEICHER, OF ST. LOUIS, MISSOURI, ASSIGNOR TO MENGEL BOX COMPANY, OF LOUISVILLE, KENTUCKY, A CORPORATION OF NEW JERSEY.

CRATE OR RACK MAKING MACHINE.

1,090,655.   Specification of Letters Patent.   Patented Mar. 17, 1914.

Application filed October 16, 1912. Serial No. 726,099.

*To all whom it may concern:*

Be it known that I, JOHN W. SCHLEICHER, a citizen of the United States, residing at St. Louis, in the State of Missouri, have invented certain new and useful Improvements in Crate or Rack Making Machines, of which the following is a specification.

My present invention pertains to crate or rack-making machines, and more specifically to machines for assembling strips of wood to produce racks such as are now commonly employed to space and hold bottles.

The main object of the invention is to produce a machine which will automatically and with rapidity assemble the crate or rack blanks, and to provide a structure which will so handle the blanks that, even though there may be present a partially defective blank, it will nevertheless be properly positioned, which operation and saving, in the great majority of instances, could not be effected where the parts are assembled by hand.

The machine stated in general terms may be said to comprise two heads or members, having a relative movement toward and from each other, said heads carrying means adapted to position and hold the main notched bars or members of the crate, combined with means for holding the cross strips or rods, preferably magazine holders, and means for forcing said strips into the notches of the bars, suitably timed mechanism being employed to operate the various parts and to effect the discharge of the assembled racks.

Figure 1:
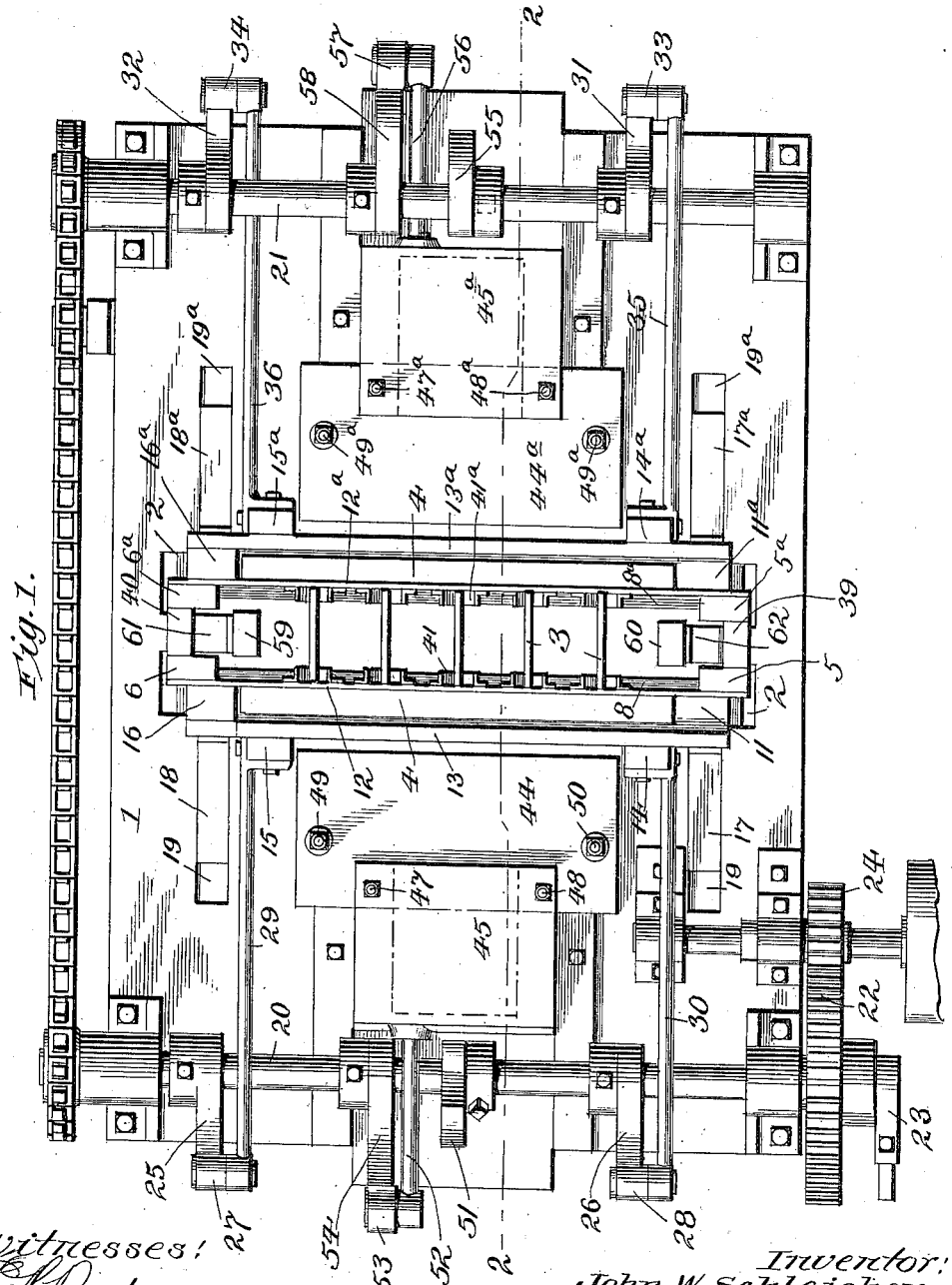
Figure 2:
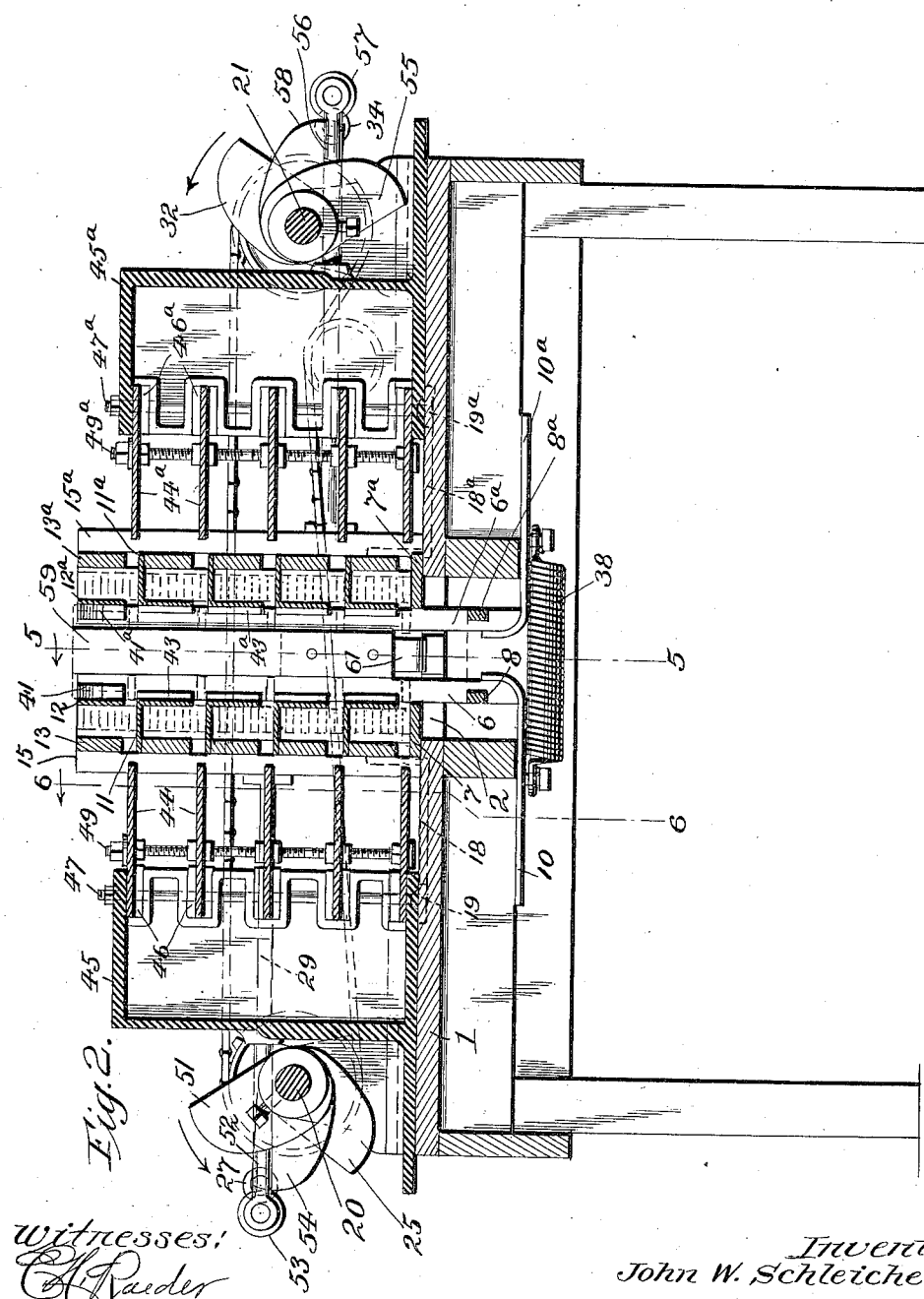
Figure 3:
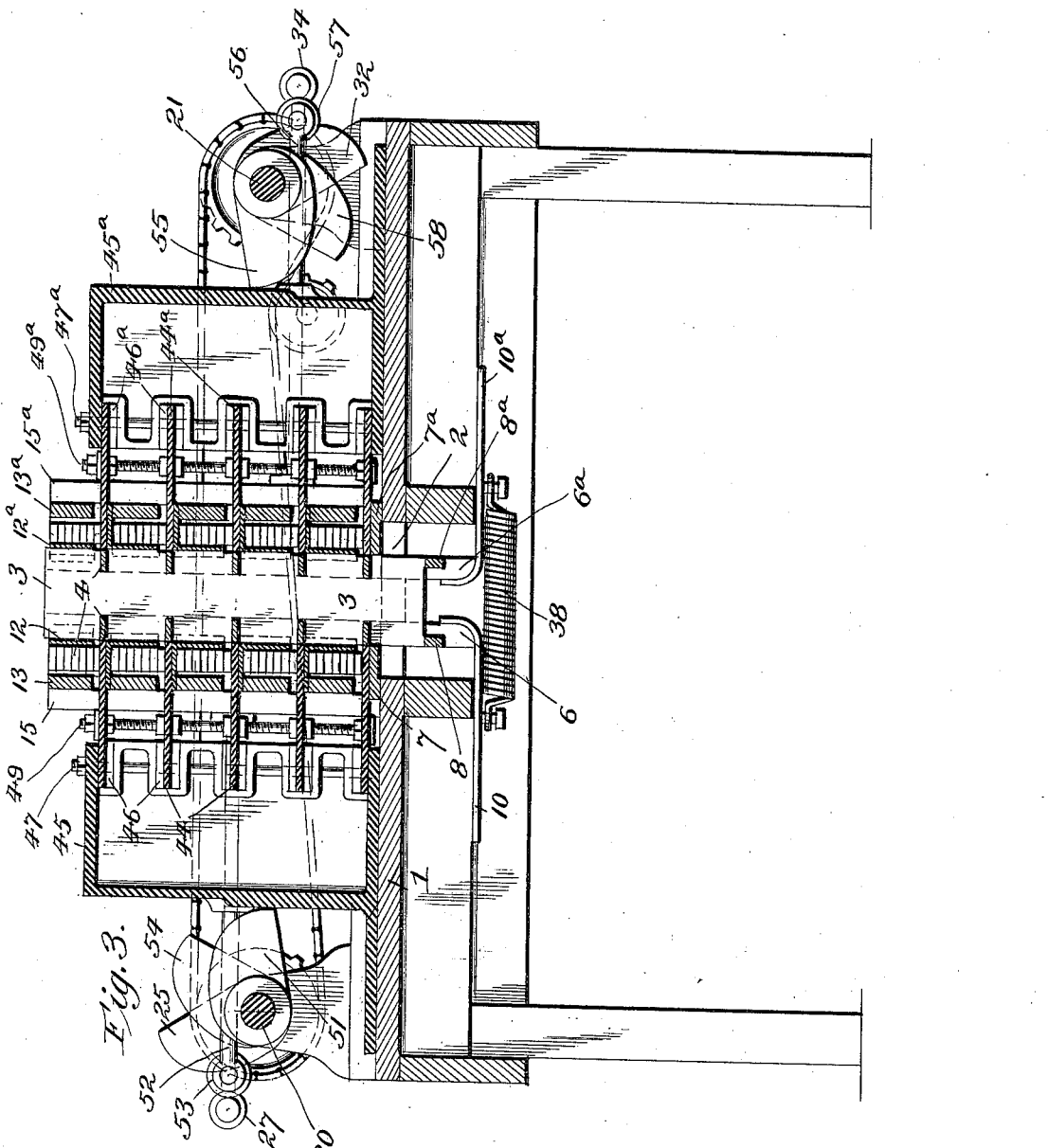

The invention in one form is illustrated in the annexed drawings, wherein:

Figure 1 is a top plan view of the machine, the parts being illustrated in that position in which the main bars of the crate are placed and held in a vertical position between the heads, preparatory to the inward movement of the bar-moving and positioning slides; Fig. 2 a vertical sectional view, taken on the line 2—2 of Fig. 1, the parts being in the same relative position; Fig. 3 a like view, the strip-positioning slides having been moved inward to force the strips into the notched bars; Fig. 4 a like view, showing the completed rack as being discharged and the slides moving outwardly; Fig. 5 a transverse sectional view, on the line 5—5, of Fig. 2, illustrating more particularly the face of one of the heads, with the bar positioning and holding devices thereon; Fig. 6 a similar view on the line 6—6 of Fig. 2; Fig. 7 a perspective view of one of the heads and its allied parts, a portion being broken away to more clearly illustrate one of the strip magazines; and Fig. 8 a perspective view of a rack.

In the drawings, 1 represents a table or bed of the machine formed or provided with a transverse elongated slot or opening 2 of a width somewhat greater than the width of the bars 3 of the rack which in the present instance is shown as composed of five bars equidistantly spaced and connected to each other by two series of oppositely-disposed strips 4.

Mounted upon the table, upon opposite sides of the slot 2 through which the completed racks are discharged, are two heads, both being alike in form, so that a description of one will suffice, corresponding parts in the other being similarly lettered with the exponent *a* added thereto, in order to prevent confusion.

The head in the construction illustrated (see Fig. 7) comprises two vertically disposed bars 5 and 6, having secured to the lower portion thereof a cross bar 7 the under face of which rests upon the table, the lower ends of the bars 5 and 6 extending through the slot 2 and carrying a supporting bar 8. Said bar with the corresponding bar 8$^a$ of the opposite head forms a support for the bars 3 when the latter are positioned between the heads, see Fig. 3. Each of said bars 5 and 6 carries at its lower end a guide arm, 9 and 10 respectively, which arms bear against the under face of the table or table framing.

Cross bar 7 forms the floor of the lowermost strip magazine, the succeeding magazines with the exception of the uppermost, being formed from inverted L-shaped bars or plates 11, the horizontally disposed member of each plate forming the floor of the magazine next above, and the depending edge of each plate being spaced away from the horizontally disposed member below by the clear width of the thickness of one of the strips 4. The front face of the uppermost magazine is produced by a flat plate 12, said magazine being open at the top. The rear wall of each magazine is formed by a bar, as 13, said bars being held in their proper relation by vertically disposed members 14 and 15 which are likewise secured to the cross-bar or floor 7. The magazines are all open at one end but closed at the opposite end by a vertically disposed bar or member 16.

Guide plates 17 and 18 are secured to the head and extend rearwardly therefrom, said plates preferably working in seats or depressions 19 formed in the table. Said plates, together with arms 9 and 10, maintain the head in its proper vertical position while still permitting it to be moved toward and from the opposite head.

It will, of course, be understood that any suitable construction adapted to maintain the heads in parallelism may be employed. To effect such relative movement (where both heads are made movable, as in the present case) the following mechanism is employed: Mounted upon the bed adjacent each end are two cross-shafts 20 and 21 (Fig. 1), shaft 20 having a gear 22 mounted thereon, and susceptible of being locked to or released from connection therewith by means of a knock-off clutch designated by 23, under control of the operator of the machine. Motion is imparted to gear 22 through a constantly driven pinion 24. Shaft 20 carries cams 25 and 26, adapted to contact with bowls 27 and 28 carried, respectively, by arms or rods 29 and 30, secured to and extending outwardly from the head. Cams 31 and 32 are carried by shaft 21, said cams coöperating with bowls 33, 34, carried at the outer ends of rods 35 and 36 secured to the second head. Springs 37 and 38 secured to and connecting the guide arms 9, 9ª and 10, 10ª in pairs, serve to urge or draw the heads toward each other in opposition to the action of the cams.

A pair of stop or spacing bars 39 and 40, preferably secured to the forward face of one of the heads or more specifically to the bars 5 and 6, Fig. 7, serve to limit the approach of the heads and to hold them in such position as to properly receive the bars or main rack members 3.

Again having reference more particularly to Fig. 7, it will be seen that plate 12 is provided with a series of Y-shaped guides 41 adapted to receive the ends of members 3 as they are placed between the heads, the front wall of each of the succeeding magazines carrying strips 42 and 43, thereby producing ways or guides which embrace the edge of said members 3 when they are fully positioned and come to rest upon the supporting bars 8 and 8ª.

The strips 4 will be stacked in the various magazines of each head, the lowermost strip in each pile being exposed and standing in line with the adjacent notches of the vertically disposed bars 3, when they are positioned as just mentioned.

To simultaneously eject the lowermost strip from each magazine and to force the same into the alined slots or notches of the several bars, I provide a plurality of ejecting and driving plates 44 adapted to coöperate with the magazines of one head and a similar set 44ª for the oppositely disposed magazine. As the two series are mounted and operated in the same manner, one set will be specifically described and the like parts of the other will be designated by similar numerals with the exponent a. Slidably mounted and guided upon the table is a frame 45 having formed in its forward vertical edges a series of pockets, one for each of the plates 44 just referred to. The pockets are of a height greater than the thickness of the plates and suitable filling blocks 46 are employed to secure the plates 44 in proper horizontal position. The plates and blocks are held in the pockets by a pair of bolts 47 and 48, the plates being also spaced and held in their proper adjusted position by a pair of threaded rods 49 and 50 upon which are mounted nuts which coöperate with the plates. The filling blocks 46 may be changed and the plates brought closer together or spaced farther apart according as the magazines are of a greater or less height, in order that crates of various sizes may be manufactured as desired.

Secured upon the shaft 20 (Figs. 1 and 3) is a cam 51, adapted to coact with the rear face of the frame 45 and to force the same inwardly toward the head. A rod 52 extends rearwardly from said frame, carrying a bowl or roller 53, adapted to coöperate with a cam 54, said cam moving the frame and the driving plates outwardly in opposition to the movement of the cam 51. Shaft 21 has secured thereto a cam 55, adapted to coöperate with frame 45ª for moving the same inwardly, the frame being provided with a rearwardly-extending rod 56, carrying a bowl 57 which coöperates with a cam 58. These parts operate in the same manner as the corresponding parts just referred to in connection with the frame 45.

To insure the discharge of the completed rack or crate, two vertically-disposed guides 59 and 60 extend upwardly between the heads, said guides being mounted upon suitable brackets 61 and 62, secured to the bed of the machine, see Fig. 5.

It is thought that the operation of the machine will be readily understood from the foregoing description, but it may be stated briefly as follows: The parts being in the positions shown in Fig. 2, the bars 3 will be passed down through the guides carried upon the innermost faces of the heads, said bars coming to rest upon the supporting bars 8 and 8ª. The magazines having been filled, the machine is thrown into operation and the frames 45 and 45ª are caused to advance, the plates 44 and 44ª being projected into the lower portion of each of the magazines and coming in contact with the adjacent edges of the lowermost strip 4, forcing said strip outwardly and into the notches formed in the bars 3. The plates contact with the strips substantially throughout the length thereof, and inasmuch as the strips rest upon a flat surface as they are moved outward from the magazines, there is little or no tendency for the strips to twist, and consequently they will be firmly and rapidly driven to position. After the frames 45 and 45$^a$ have moved inwardly to their full extent they are given an outward movement through the cams above set forth, and the heads are likewise withdrawn, so that the supporting bars 8 and 8$^a$ move from beneath the lower end of the rack-bars 3 and the completed rack passes downwardly through the opening in the table, as shown in Fig. 4, the guides 59 and 60 at such time preventing the rack from tipping over to such an extent that it might otherwise be caught between the heads or upon the table.

In practice it is customary to place a conveyer-belt beneath the table to convey the completed racks to any suitable point as they pass from the machine.

It is evident that in so far as the operating mechanism and the particular construction of the machine are concerned they may be varied without departing from the scope or spirit of the invention.

Having thus described my invention, what I claim is:

1. In a machine for assembling racks, the combination of a pair of relatively movable heads; mechanism working in conjunction with said heads and adapted to hold a series of strips; means for positioning a series of notched bars between said heads; and means for ejecting the strips and forcing the same into the notches of the bars when the heads are brought toward each other.

2. In a machine for assembling racks, the combination of a pair of heads; means carried by said heads for positioning a series of notched bars between the same; means for securing a relative movement of said heads toward and from each other; a series of strip-holding magazines carried by each head; and means for ejecting the strips from said magazines and forcing the same into the notches of adjacent bars.

3. In a machine for assembling racks, the combination of a pair of heads; means carried by said heads for positioning a series of notched bars between the same; a series of magazines carried by each head; means for securing a relative movement of the heads toward and from each other; and a series of ejecting and driving plates, one for each magazine, adapted to eject the lowermost strip and to force the same into the adjacent notches of the bars.

4. In a machine for assembling racks, the combination of a pair of heads; guides mounted upon the adjacent faces of said heads, the guides being adapted to hold and position a plurality of notched bars; means for moving said heads toward and from each other; a series of magazines carried by each of said heads; a plurality of ejecting and driving plates, one for each of the magazines; and means for moving said ejecting and driving plates inwardly to cause the same to eject the lowermost strip in each of the magazines and force the same inwardly into the notches of the bars.

5. In a machine for assembling racks, the combination of a pair of heads; a series of guides mounted upon the forward face of each head; means carried by the heads adapted to coöperate with said guides and to hold between the heads a plurality of notched bars; means for moving said heads toward and from each other; a series of magazines carried by each of the heads and adapted to contain strips; a frame located upon the table adjacent to each of said heads; means for moving said frames toward and from the heads; and a series of ejecting and driving plates carried by each head, one plate for each frame, said plates being adapted to pass into the lower portion of each magazine and to force the lowermost strip outwardly therefrom and into the alined notches of the adjacent bars.

6. In a machine for assembling racks, the combination of a pair of heads; means for moving said heads toward and from each other; a series of vertically-disposed guides formed upon the adjacent faces of said heads, said guides being adapted to position a series of notched bars between the heads; supporting means carried by the heads and passing beneath the lowermost ends of the notched bars when the heads are in their closest position; a series of magazines carried by each of said heads; a plurality of ejecting and driving plates, one for each magazine; and means for moving said plates inwardly through the lowermost portion of the magazines to eject the lowermost strips and to bring the same into position in the alined notches of the bars.

7. In a machine for assembling racks, the combination of a plurality of oppositely-disposed guides adapted to hold a plurality of notched bars; means lying below said bars for temporarily supporting the same; a plurality of magazines located in rear of said guides; a plurality of ejecting and driving plates, one for each magazine, adapted to eject the lowermost strip from the magazine and to position the same in the alined notches of the bars; and means for withdrawing said supporting means.

8. In a machine for assembling racks, the combination of a plurality of guides adapted to hold a series of notched bars between them; means for temporarily supporting said bars; a plurality of magazines adapted to hold a series of strips, the bottom of one magazine and the forward face of the next lowest magazine being formed from an L-shaped angle-iron; a series of ejecting and driving plates adapted to work over the base of each magazine and to eject the lowermost strip therefrom and to position the same in the alined slots of the bars; and means for actuating said plates.

9. In a machine for assembling racks, the combination of a pair of heads, each head comprising a series of magazines adapted to hold a plurality of strips, with guides formed upon the face of each magazine; means for securing a relative movement of said heads toward and from each other, whereby when they assume their closest position the oppositely-disposed guides form ways in which a plurality of notched bars may be positioned; a plurality of ejecting and driving plates, one for each magazine; and means for actuating said ejecting and driving plates.

10. In a machine for assembling racks, the combination of a plurality of vertically-disposed and relatively-movable clamping means adapted to hold a series of notched bars; a supporting device below said clamping means; means for driving a plurality of strips into the notches in said bars; and means for removing the supporting device and withdrawing the bar-clamping means, whereby the completed rack may automatically drop out of the machine.

11. In a machine for assembling racks, the combination of a pair of relatively movable heads; a series of vertically-disposed guides carried thereby and adapted to hold a series of notched bars; a temporary support located below said guides and beneath the bars positioned in the guides; means for securing a relative movement of the heads to cause the same to clamp the notched bars; means for driving strips into the notches of the bars; and means for withdrawing the temporary support and separating the heads, whereby the completed rack may automatically drop from the machine.

In testimony whereof I have signed my name to this specification in the presence of two subscribing witnesses.

JOHN W. SCHLEICHER.

Witnesses:
    ED. McGROARTY,
    WM. W. WRIGHT.

---

Copies of this patent may be obtained for five cents each, by addressing the "Commissioner of Patents, Washington, D. C."